US008194945B2

(12) United States Patent
Sato (10) Patent No.: US 8,194,945 B2
(45) Date of Patent: Jun. 5, 2012

(54) COMPUTER AIDED IMAGE ACQUISITION AND DIAGNOSIS SYSTEM

(75) Inventor: Kazuhiko Sato, Tokyo (JP)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 736 days.

(21) Appl. No.: 10/982,594

(22) Filed: Nov. 4, 2004

(65) Prior Publication Data

US 2005/0105683 A1 May 19, 2005

(30) Foreign Application Priority Data

Nov. 14, 2003 (JP) ................................. 2003-384562

(51) Int. Cl.
*G06K 9/00* (2006.01)

(52) U.S. Cl. ........ 382/128; 250/311; 324/309; 358/474; 382/232; 382/268; 600/410; 600/440; 725/151

(58) Field of Classification Search .................. 382/128, 382/154, 168–172
See application file for complete search history.

(56) References Cited

U.S. PATENT DOCUMENTS

| | | | | |
|---|---|---|---|---|
| 4,257,102 A * | 3/1981 | Horiba et al. | ................. | 600/425 |
| 4,984,157 A * | 1/1991 | Cline et al. | ..................... | 345/424 |
| 4,991,092 A * | 2/1991 | Greensite | ...................... | 382/131 |
| 5,003,264 A * | 3/1991 | Koizumi et al. | .............. | 324/309 |
| 5,150,427 A | 9/1992 | Frazee et al. | | |
| 5,309,356 A * | 5/1994 | Nishide et al. | ................ | 382/131 |
| 5,454,371 A | 10/1995 | Fenster et al. | | |
| 5,553,207 A | 9/1996 | Sekiguchi et al. | | |
| 5,602,891 A * | 2/1997 | Pearlman | ......................... | 378/62 |
| 5,633,951 A * | 5/1997 | Moshfeghi | .................... | 382/154 |
| 5,724,493 A | 3/1998 | Hosoya et al. | | |
| 5,859,891 A * | 1/1999 | Hibbard | .......................... | 378/62 |
| 5,967,985 A * | 10/1999 | Hayakawa | .................... | 600/440 |
| 6,055,295 A | 4/2000 | Murthy et al. | | |
| 6,269,484 B1 * | 7/2001 | Simsic et al. | ................. | 725/151 |
| 6,370,413 B1 | 4/2002 | Alvarez et al. | | |
| 6,515,656 B1 | 2/2003 | Wittenburg et al. | | |
| 6,603,990 B2 * | 8/2003 | Zhang et al. | .................. | 600/410 |
| 6,748,113 B1 * | 6/2004 | Kondo et al. | ................. | 382/232 |

(Continued)

FOREIGN PATENT DOCUMENTS

DE 19812749 9/1999

(Continued)

OTHER PUBLICATIONS

"Separation of Water and Fat MR Images in a Single Scan at .35T Using "Sandwich" Echoes" by Weiguo Zhang et al pp. 909-917.*

(Continued)

*Primary Examiner* — Anand Bhatnagar
*Assistant Examiner* — Tsung-Yin Tsai
(74) *Attorney, Agent, or Firm* — Armstrong Teasdale LLP (57) ABSTRACT

A computer-aided image acquisition and diagnosis system, which generates and files images for facilitating the reading and diagnosis based on the acquired images. The X-ray CT apparatus for obtaining diagnosis image from the projection data of imaging of a subject, includes a selector means for selecting the detection object to be anticipated, a scanner means for scanning the subject placed in position, an image processing means for reconstructing the subject image from the projection data obtained from the scanner means, an extractor means for extracting the detection object selected in the selector means from within the reconstructed image, and a display means for displaying the detection object extracted by the extractor means.

20 Claims, 6 Drawing Sheets

U.S. PATENT DOCUMENTS

| | | | |
|---|---|---|---|
| 6,754,376 B1 | 6/2004 | Turek et al. | |
| 7,054,040 B2* | 5/2006 | Shoda et al. | 358/474 |
| 7,650,043 B2* | 1/2010 | Shim et al. | 382/268 |
| 2002/0090126 A1* | 7/2002 | Oosawa | 382/132 |
| 2003/0021373 A1* | 1/2003 | Ukita et al. | 378/4 |
| 2003/0179915 A1* | 9/2003 | Goto | 382/128 |
| 2003/0215120 A1* | 11/2003 | Uppaluri et al. | 382/128 |
| 2003/0223627 A1* | 12/2003 | Yoshida et al. | 382/128 |
| 2004/0108459 A1* | 6/2004 | Furukawa et al. | 250/311 |
| 2004/0196957 A1* | 10/2004 | Ando | 378/82 |
| 2004/0264627 A1* | 12/2004 | Besson | 378/5 |
| 2005/0105683 A1* | 5/2005 | Sato | 378/62 |
| 2005/0147303 A1* | 7/2005 | Zhou et al. | 382/190 |
| 2005/0238232 A1* | 10/2005 | Ying et al. | 382/170 |
| 2006/0013354 A1* | 1/2006 | Heismann | 378/4 |

FOREIGN PATENT DOCUMENTS

| | | |
|---|---|---|
| EP | 0354026 A2 | 8/1989 |
| EP | 0424912 A2 | 10/1990 |
| JP | 07236634 | 9/1995 |
| JP | 2001137230 A | 5/2001 |
| JP | 2002253545 A | 9/2002 |
| JP | 2002-325761 | 11/2002 |
| JP | 2002325761 | 11/2002 |
| JP | 2002360563 | 12/2002 |
| JP | 2003265460 | 9/2003 |

OTHER PUBLICATIONS

Zhang et al "Separation of Water and Fat MR Images in a Single Scan at .35T Using "Sandwich" Echoes" ISMRM 1996.*

English language Patent Abstract of Japan for JP 2002-253545 (2 pages).

English language Patent Abstract of Japan for JP 2001-137230.

European Patent Office, European Search Report for Application No. 04256955.8-2218, Jun. 22, 2010, 4 pages, EP.

Frontiers in Biomedical Engineering, Intelligent Diagnostic Imaging and Analysis for Radiology, Jan. 1, 2003, pp. 315-325.

Radiologic Clinics of North America, Lung Nodule Detection and Characterization with Multislice CT, May 3, 2003, vol. 41, No. 3, pp. 575-597, VI.

English language Patent Abstract of Japan for JP 2002-325761 (2 pages).

* cited by examiner

# COMPUTER AIDED IMAGE ACQUISITION AND DIAGNOSIS SYSTEM

CROSS REFERENCE TO RELATED APPLICATIONS

This application claims the benefit of Japanese Application No. 2003-384562 filed Nov. 14, 2003.

BACKGROUND OF THE INVENTION

The present invention is related to a computer aided image acquisition and diagnosis system, and more specifically to a computer aided image acquisition and diagnosis system for imaging an object to obtain a diagnosis image from the projection data.

For an imaging apparatus of tomographic image, X-ray CT (computed tomography) apparatus is known, which generates a tomographic image, based on the computation, by irradiating X-ray and detecting the X-ray transmitted through an object. An X-ray CT is capable of imaging a number of tomographic images at once, thanks to the speed-up and parallelization of a scanned range.

The tomographic images obtained from an X-ray CT or an MRI (magnetic resonance imaging) apparatuses may be processed with the methods such as three dimensional (3D) rendering, Colonography, and 3D MIP (minimum intensity projection) to reconstruct a 3D image.

In the image processing, automation of image processing is actively in progress. For example, there is a computer aided image diagnosis system, in which, when a user selects a point that he or she recognizes to be abnormal, on a display unit, on a tomographic image obtained from the image acquisition apparatus, a predetermined algorithm in response processes the image area around the abnormal point to present the user. The computer aided image diagnosis system is also referred to as a CAD (computer aided diagnosis). There also is a system in development in which a point in the aorta is pointed by the user on a tomographic image, the system extracts automatically the blood vessels from the image and processes the image to generate a 3D image to be displayed on the display unit.

As a computer aided image acquisition and diagnosis system as have been described above, there is known a system which processes a predetermined effect on a tomographic image to generate a 3D image, thus generated 3D image is then subject to a process for determining and extracting the abnormal point for displaying on the display (see, patent reference 1).

The tomographic imaging using an image acquisition system and the image processing using the CAD is being performed on a single shared console. As a result, the user may image the object and immediately process the tomographic image thus obtained without moving to another place, or waiting for a while. As an example, the reconstruction of image is facilitated by sharing the hard disk drive unit for storing the projection data of the X-ray CT apparatus.

However, when imaging a number of tomographic images, it takes long from the imaging, extraction of the detection object, processing of tomographic images, to the reading and diagnosing the final image. When imaging a number of images or processing a complex effect on the images, there has been an inconvenience that the storage of images obtained and processed was not facilitated.

[Patent Reference] JP-A-2002-325761

As have been described above, along with the progress of imaging system and support system, there arises a problem in generating images useful in the diagnosis from the obtained tomographic images and in storing according to a classification rule.

SUMMARY OF THE INVENTION

Therefore, an object of the present invention is to provide a computer aided image acquisition and diagnosis system, which can generate images easily for reading and diagnosis from the tomographic images and filing. In order to achieve the above-mentioned objects, the computer aided image acquisition and diagnosis system in accordance with the present invention relates to an computer aided image acquisition and diagnosis system for imaging an object and for obtaining a diagnostic image from the projection data thereof, and includes a selector means for selecting a detection object to be anticipated prior to imaging; a scanner means for scanning the object placed in position; an image processing means for generating a tomographic image of the object from the projection data obtained by the scanner means; an extractor means for extracting the detection object selected in the selector means from within the tomographic image generated; and a display means for displaying the detection object extracted by the tomographic image and the extractor means.

In an aspect of the computer aided image acquisition and diagnosis system in accordance with the present invention, the selector means selects the detection object to be anticipated prior to scanning.

The scanning means scans the object placed in position.

The image processing means generates a tomographic image of the object from the projection data obtained from the scanner means.

The extractor means extracts the detection object selected by the selector means from within the tomographic image generated.

The display means displays the detection object thus extracted by the extractor means.

In accordance with the computer aided image acquisition and diagnosis system of the present invention, images wieldy in reading and diagnosis from the tomographic images obtained are generated and filed.

Further objects and advantages of the present invention will be apparent from the following description of the preferred embodiments of the invention as illustrated in the accompanying drawings.

DETAILED DESCRIPTION OF THE INVENTION

A detailed description of some preferred embodiments embodying the present invention will now be given referring to the accompanying drawings.

Figure 1:
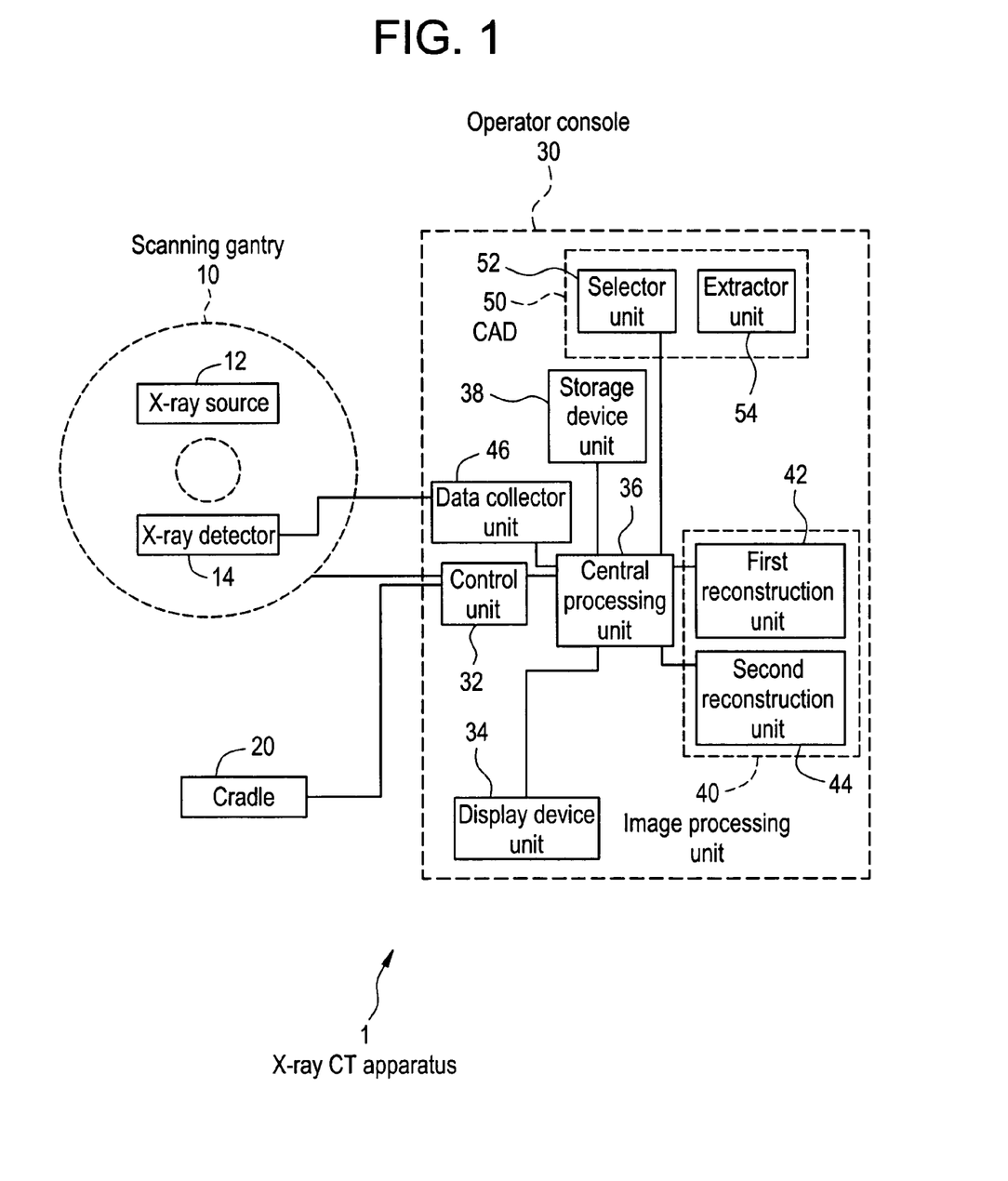
FIG. 1 is a schematic block diagram of an X-ray CT apparatus 1 in accordance with the preferred embodiment.

Now referring to FIG. 1, there is shown a schematic block diagram of an X-ray CT apparatus 1 in accordance with the preferred embodiment. The X-ray CT apparatus 1 corresponds to one preferred embodiment of the computer aided image acquisition and diagnosis system in accordance with the present invention.

The X-ray CT apparatus 1 includes a scanning gantry 10, a cradle 20, and an operator console 30. The scanning gantry 10 is also referred to as simply a "gantry" 10. The scanning gantry 10 corresponds to one preferred embodiment of the scanning means in accordance with the present invention.

The scanning gantry 10 includes an X-ray irradiation source 12, and an X-ray detector 14 mounted in opposition to the X-ray source 12 on the other side of the object. The scanning gantry 10 revolves around the object with a predetermined rotating axis being as a center, to irradiate X-ray from the X-ray source 12 and to detect the X-ray transmitted through the object by the X-ray detector 14. The X-ray source 12 corresponds to a preferred embodiment of the X-ray irradiation unit in accordance with the present invention, and the X-ray detector 14 corresponds to a preferred embodiment of the X-ray detector unit.

The cradle 20 mounts a subject. The cradle 20 is placed such that the imaging area of the subject can be placed within the movable range of the scanning gantry 10. The cradle 20 is controlled by the operator console 30 of the relative distance to the scanning gantry 10.

The operator console 30 is connected to both the scanning gantry 10 and to the cradle 20. The operator console 30 is provided for controlling the movement and scanning of the scanning gantry 10 as well as the relative distance between the cradle 20 and the scanning gantry 10. The operator console 30 may be achieved with a console table, a display screen, a keyboard, and so on.

The operator console 30 includes a control unit 32, a display device unit 34, a central processing unit 36, a storage device unit 38, and an image processing unit 40, a data collector unit 46, and CAD 50.

The data collector unit 46 is connected to the X-ray detector 14 of the scanning gantry 10 and to the central processing unit 36. The data collector unit 46 collects the projection data detected by the X-ray detector 14 of the scanning gantry 10 to output to the central processing unit 36.

The storage device unit 38 is connected to the central processing unit 36. The storage device unit 38 stores data such as date, name of subject, imaging region along with the reconstructed image. The data and image stored therein can be retrieved according to the instruction from the central processing unit 36. The storage device unit 38 can be achieved by for example a memory.

The control unit 32 is connected to the scanning gantry 10, cradle 20, and the central processing unit 36. The control unit 32 controls the operation and positioning of the scanning gantry 10 and the cradle 20 according to the instruction from the central processing unit 36. The control unit 32 can be achieved by for example a CPU.

The CAD 50 includes a selector unit 52 and an extractor unit 54. The CAD 50 is connected to the central processing unit 36 and is operated by the instruction from the central processing unit 36.

The CAD 50 for example selects a detection object to be anticipated. The CAD 50 also extracts the detection object in the image output from the central processing unit 36. The CAD 50 can be achieved by for example a program.

The selector unit 52 includes a database which stores parameters including typical forms and tones of shades known in various detection objects. The selector unit 52 corresponds to a preferred embodiment of the selector means in accordance with the present invention.

The extractor unit 54 extracts the detection object selected by the selector unit 52 from the tomographic image data output from the central processing unit 36. The extractor unit 54 corresponds to a preferred embodiment of the extractor means in accordance with the present invention.

The image-processing unit 40 includes a first reconstruction unit 42 and a second reconstruction unit 44. The image-processing unit 40 receives the projection data from the central processing unit 36 to generate a tomographic image of the object. The image-processing unit 40 receives the tomographic image data with the detection object extracted in the CAD 50 through the central processing unit 36 to generate the image of the detection object based on the set conditions in the CAD 50. The image-processing unit 40 transmits thus generated images to the central processing unit 36. The image-processing unit 40 can be achieved by for example a program. It should be noted here that the first reconstruction unit 42 and the second reconstruction unit 44 in the image-processing unit 40 may be formed by independent programs. The image-processing unit 40 corresponds to a preferred embodiment of the image processing means in accordance with the present invention.

The first reconstruction unit 42 performs the image reconstruction processing on the projection data output from the central processing unit 36, based on the tomographic image generation conditions predetermined in the selector unit 52, to generate the tomographic image of each slice plane. The first reconstruction unit 42 outputs thus generated tomographic image to the central processing unit 36. The image generated in the first reconstruction unit 42 is referred to as the "tomographic image" herein below.

The second reconstruction unit 44 receives the image data of the detection object extracted in the CAD 50 through the central processing unit 36. The second reconstruction unit 44 performs the image reconstruction processing on the image data or the projection data extracted by the CAD 50, based on the conditions set in the selector unit 52. More specifically, the second reconstruction unit 44 generates an image of detection object with the altered imaging view area and shade range of the tomographic image generated by the first reconstruction unit 42. The second reconstruction unit 44 further distinguishes the interface between the detection object and its surroundings. The second reconstruction unit 44 outputs thus generated image to the central processing unit 36. The image generated by the second reconstruction unit 44 is referred to as a "detection object image" herein below.

The display device unit 34 is connected to the central processing unit 36. The display device unit 34 displays, based on the instruction from the central processing unit 36, images generated by the image processing unit 40, detection objects extracted by the CAD 50, and any other information. The display device unit 34 displays the detection object in a different color from the surrounding area, based on the instruction from the central processing unit 36. The display device unit 34 corresponds to a preferred embodiment of the display means in accordance with the present invention.

The central processing unit 36 outputs the projection data input into the data collector unit 46 to the image-processing unit 40. The central processing unit 36 outputs the image data from the image-processing unit 40 to the CAD 50.

The central processing unit 36 also outputs the image generated and extracted by the image-processing unit 40 and the CAD 50 to the storage device unit 38.

Furthermore, the central processing unit 36 outputs to the display device unit 34 the image generated by the image processing unit 40 and the detection object detected by the CAD 50. The central processing unit 36 calculates a volume of the detection object extracted based on the 3D image.

Now the operation of the X-ray CT apparatus 1 in accordance with the preferred embodiment will be described in greater details herein below.

Figure 2:
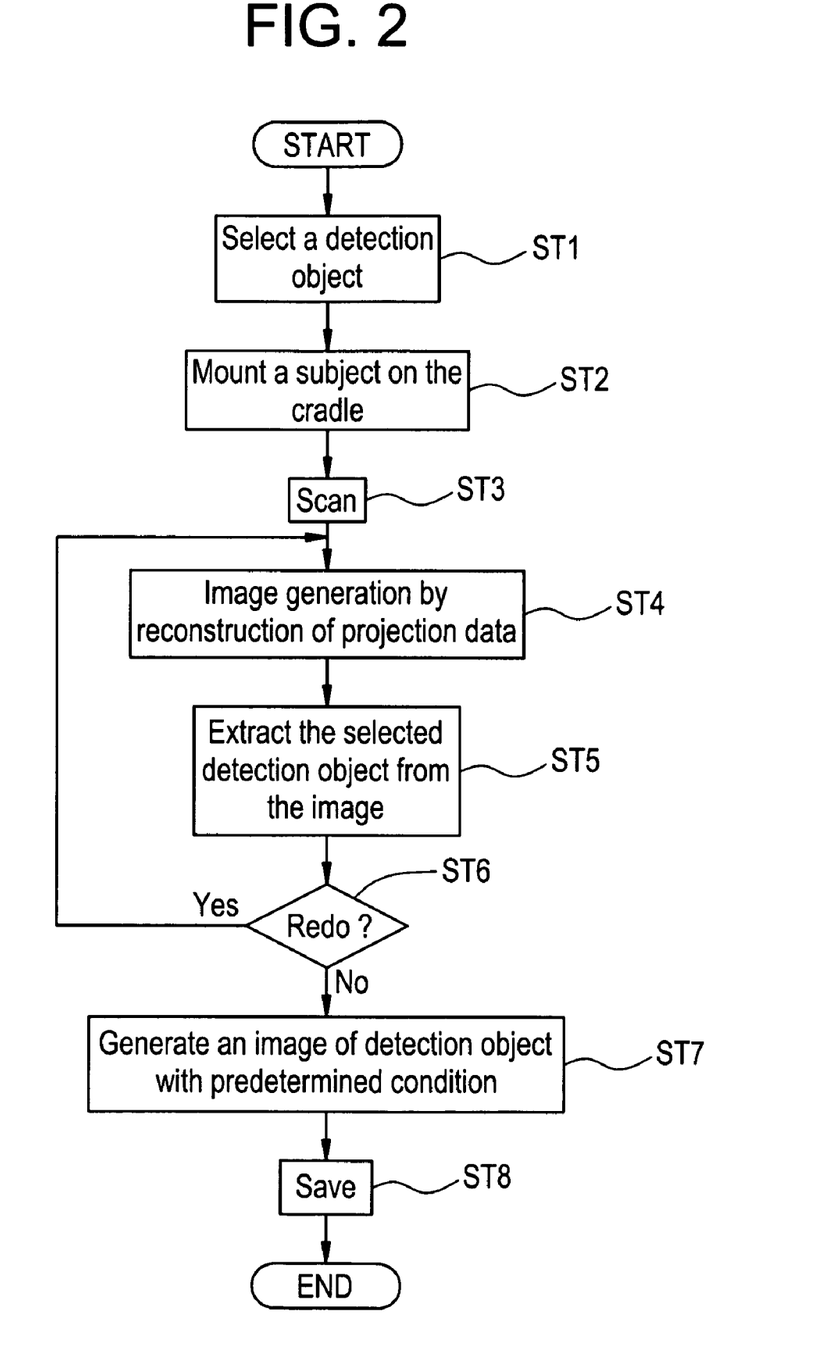
FIG. 2 shows a flow chart illustrating the operation of the X-ray CT apparatus 1 shown in FIG. 1 in accordance with the preferred embodiment of the present invention.

FIG. 2 shows a flow chart illustrating the operation of the X-ray CT apparatus 1 in accordance with the preferred embodiment of the present invention.

First, the user operates the operator console 30 to select in the selector unit 52 of the CAD 50 through the central processing unit 36 the detection object to be anticipated for the subject (ST 1). For a subject to be imaged for the lung, lung tumor is set to the detection object.

At the same time, the user sets the field of view (FOV), window level (W/L), window width (W/W), magnification ratio, etc for the parameters to generate the tomographic image and detection object image.

For example, a condition set shown in Table 1 below can be set for the parameters for generating the tomographic image of subject and detection object image.

TABLE 1

|     | Tomographic image | Detection object image |
| --- | --- | --- |
| OV  | 35 cm | 10 cm |
| /W  | 1000 | 1000 |
| /L  | −700 | −700 |

By setting a smaller FOV when generating the detection object image, the detection object area will be magnified to obtain an image of higher resolution. Also, by setting a smaller W/W, the upper and lower limits of the CT value is restricted to a narrow range, resulting in a higher contrast in the detection object image.

Next, the user mounts the subject on the cradle (ST 2). Thereafter, the user operates the operator console 30 to select the completion of steps ST1 and ST2. By doing this, the following steps will be performed under the control of the central processing unit 36.

Next, the scanning gantry 10 moves under the control of the central processing unit 36 while at the same time irradiating X-ray from the X-ray source 12 to scan the subject (ST 3). The X-ray detector 14 in turn collects analog data of the X-ray intensity. The X-ray detector 14 converts thus collected analog data to output to the data collector unit 46 as projection data.

The data collector unit 46 outputs the projection data through the central processing unit 36 to the image-processing unit 40. At this point, the central processing unit 36 may output the projection data to the storage device unit 38. The storage device unit 38 may store the projection data.

The first reconstruction unit 42 of the image processing unit 40 reconstruct the projection data based on the parameters shown in Table 1 to generate a plurality of tomographic images corresponding to the slice thickness in the imaging field of the subject (ST 4). The image-processing unit 40 outputs the generated tomographic image data to the central processing unit 36. The central processing unit 36 outputs the tomographic image data to the display device unit 34 to display the tomographic image on the display device unit 34 if necessary. The user may decide whether or not to proceed to the following processing based on the observation of the tomographic image.

The central processing unit 36 outputs data of a plurality of generated tomographic images to the extractor unit 54 of the CAD 50. The extractor unit 54 extracts the detection object set by the selector unit 52 of the CAD 50 from within the tomographic image data (ST 5).

For example, when the lung tumor is previously set as the detection object in the selector unit 52, the extractor unit 54 uses the characteristics parameters such as the form, partial form, and shadow of the lung tumor, stored in the selector unit 52 to seek any match in every tomographic image data.

More specifically, the selector unit 52 sets a predetermined threshold for each of characteristics parameters. The extractor unit 54 extracts a matrix that has a CT value beyond the set threshold from the tomographic image data. The extractor unit 54 then computes a continuous region in the extracted matrix to form candidates of tumor form and partial form, and compares them with the stored form in the selector unit 52. The extractor unit 54 selects a matched form as the detection object. The extractor unit 54 may otherwise compute the surface area of the continuous area to select as the detection object.

After the detection object is extracted from the tomographic image data, The CAD 50 outputs the tomographic image data to the central processing unit 36. The central processing unit 36 then outputs the tomographic image having the detection object extracted to the display device unit 34, and the user may determine whether or not to proceed to the following steps while observing the tomographic image with the detection object extracted.

When the extraction is not performed successfully, the central processing unit 36 retrieves the stored projection data from the storage device unit 38 based on the instruction from the extractor unit 54, to output the projection data to the first reconstruction unit 42 to redo the processing from the tomographic image generation (ST 4) step (ST 6). The data storage in the storage device unit 38 will be described later.

If the extracted detection object is different from that anticipated, the processing can be performed again from the desired step according to the decision of the user, as have been described above. For example, an anticipated detection object might be selected in the step ST 1 to extract the detection object from the projection data stored in the first reconstruction unit 42, or the projection data might be retrieved again by changing the scanning area in the step ST 2.

Next, the central processing unit 36 outputs the tomographic image data with the detection object extracted to the second reconstruction unit 44. The second reconstruction unit 44 in turn follows the conditions set in the selector unit 52 in the step ST 1 (see Table 1) to generate an image having the region around the extracted detection object enlarged from the tomographic image data or projection data (ST 7). The image generated by the first reconstruction unit 42 and the image generated by the second reconstruction unit 44 may be generated such that the conditions such as FOV and W/W will be different.

The second reconstruction unit 44 can detect the value beyond a predetermined threshold when the threshold of the CT value corresponding to each matrix is set for the generated detection object image, or identify the detection object from the surrounding area by determining the difference of CT values between the adjoining matrices.

The second reconstruction unit 44 outputs thus generated enlarged image of the detection object to the central processing unit 36. The central processing unit 36 in turn outputs the enlarged image of the detection object to the display device unit 34, which displays the image. At this point, the display device unit 34 uses a different color for the detection object from the color for the surroundings.

Thereafter, the user may read and diagnose the detection object displayed on the display unit.

In the above processing steps, the user needs only selecting the imaging conditions in step ST 1 and step ST 2 and mounting the subject, and selecting whether or not proceeding the image processing, extracted and enlarged image of the detection object can be obtained.

[Data Storage]

Now referring to FIG. 1 and FIG. 2, data storage of image data will be described in greater details.

In FIG. 2, after the generation of an image (ST 7) based on the condition (ST 1) set to the selector unit 52 with respect to the detection object, the central processing unit 36 outputs to the storage device unit 38 the image data including the projection data and the two dimensional images generated by the first reconstruction unit 42 and the second reconstruction unit 44. The storage device unit 38 stores the data (ST 8). The image data means the projection data, two dimensional image data, and three-dimensional image data that will be described later.

The storage device unit 38 stores along with the image data, any data including the imaging condition such as computed volume of the detection object, imaging date, imaging purpose, subject name, imaging angle, as well as the number of images.

The data stored in the storage device unit 38 can be retrieved under the control of the central processing unit 36.

As can be seen from the foregoing, data retrieval is facilitated for the comparison steps (described later) since the storage device unit 38 stores previously selected data items on the detection object in addition to the image data.

[Three-dimensional image display] Now referring to FIGS. 3 to 5, the steps of generating three-dimensional image of the previously selected detection object will be described in greater details.

Figure 3:
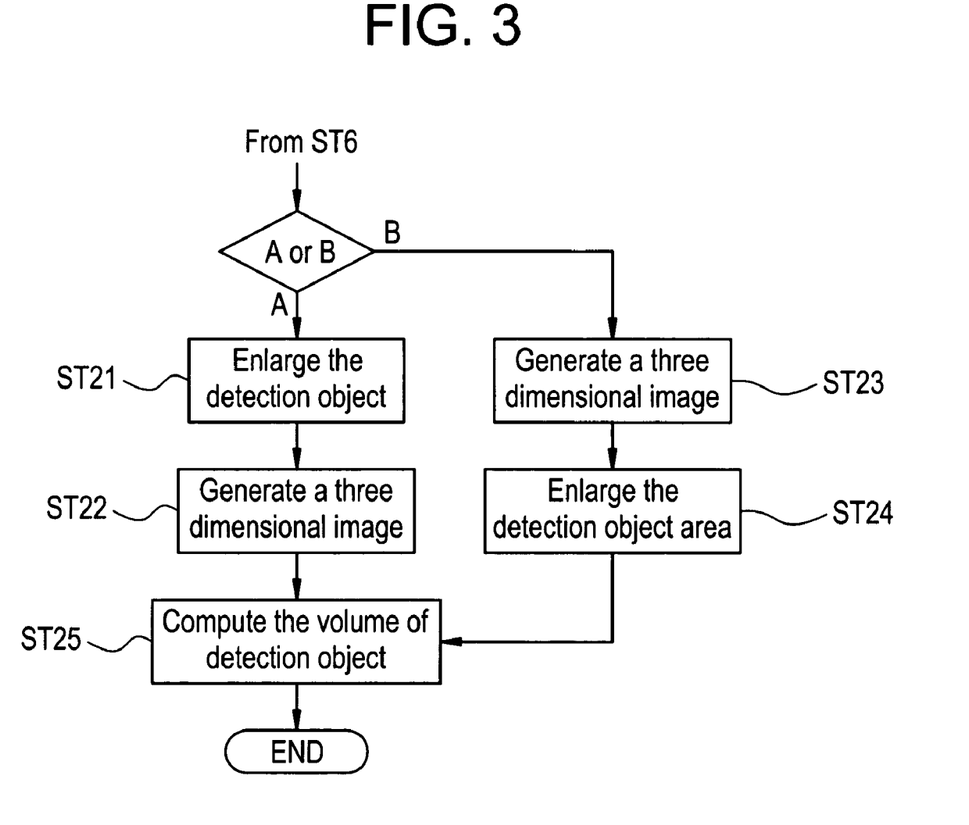
FIG. 3 shows a flow chart illustrating the operation of the X-ray CT apparatus 1 in accordance with the preferred embodiment.

FIG. 3 shows a flow chart illustrating the operation of the computer aided image acquisition and diagnosis system 1 in accordance with the preferred embodiment.

First, the user sets the conditions in a similar manner to the step ST 1 of FIG. 2, and specifies the display area and display magnification of the detection object.

Then, by using the steps ST 2 to ST 6 of FIG. 2, the detection object will be extracted on the operator console 30.

Next, the second reconstruction unit 44 generates a three-dimensional image of the detection object extracted. There are two methods for generating a three-dimensional image, namely the first process A and the second process B.

The user selects the generation of a three dimensional image in the step ST 1 of selecting the detection object, and previously selects any one of two methods of three dimensional image generation. Accordingly, the second reconstruction unit 44 will generate a three-dimensional image based on the previously selected process method at the time when the above step ST 6 is completed.

Now referring to FIG. 3 and FIG. 4, the first process method A will be described in greater details.

Figure 4A:
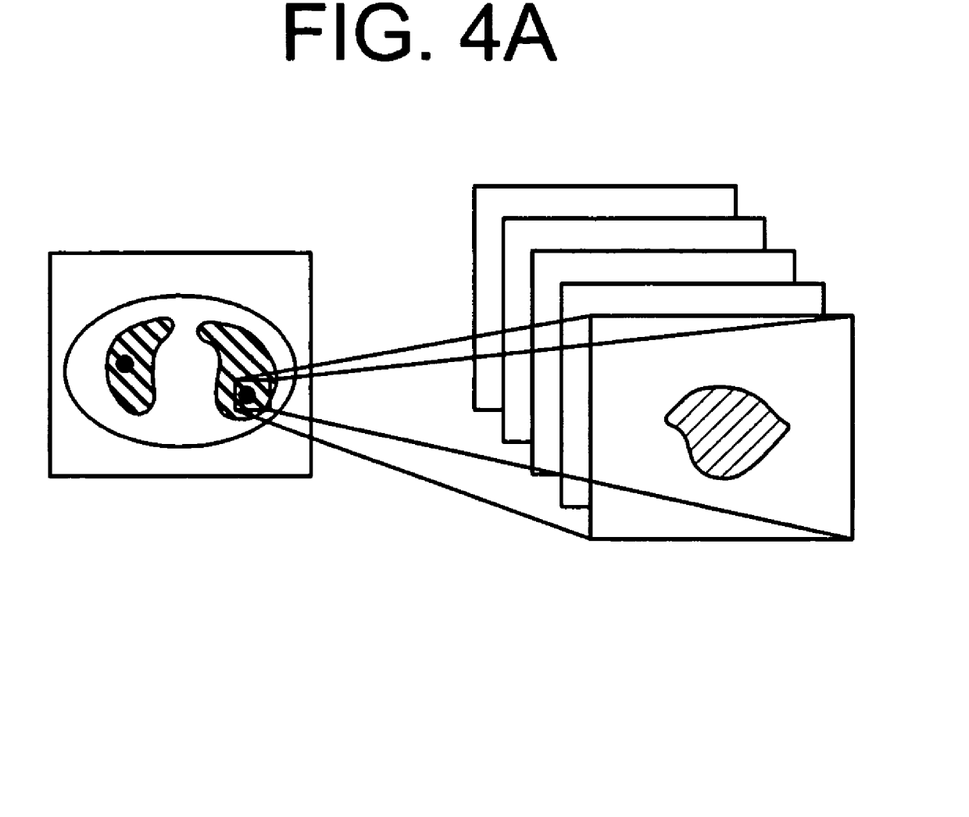
FIG. 4 shows a schematic diagram illustrating the operation of the X-ray CT apparatus 1 shown in FIG. 3.
Figure 4B:
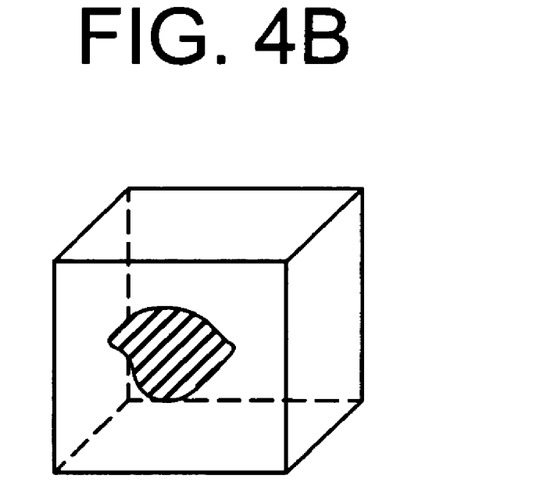

FIG. 4(*a*) and FIG. 4(*b*) are schematic diagrams illustrating the first processing method A.

As shown in FIG. 4(*a*), the second reconstruction unit 44 uses every tomographic image with the detection object extracted, as similar to step ST 7, in accordance with the condition defined in step ST 1, to generate a plurality of two-dimensional images (ST 21). The generating condition of two-dimensional image can be as shown in Table 1.

Next, as shown in FIG. 4(*b*), the second reconstruction unit 44 performs the interpolation on the plurality of two dimensional images with the detection object enlarged to generate a three dimensional image of the detection object (ST 22). The second reconstruction unit 44 outputs thus generated three-dimensional image to the display device unit 34 through the central processing unit 36, to display the image according to the display condition determined in step ST 1.

Thereafter, the central processing unit 36 computes the volume of the detection object from the generated three-dimensional image (ST 25).

Now referring to FIG. 3 and FIG. 5, the second process method B will be described in greater details.

Figure 5A:
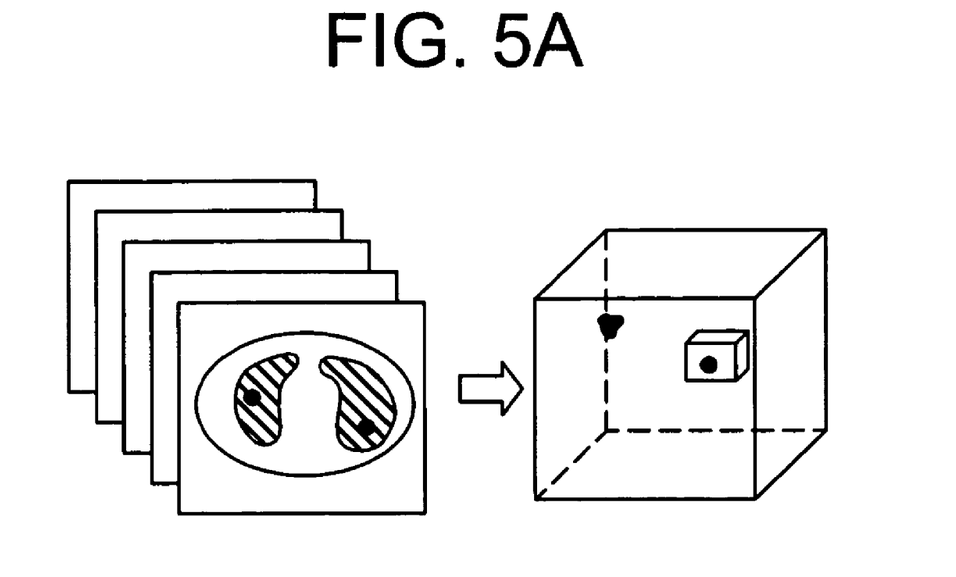
FIG. 5 shows a schematic diagram illustrating the operation of the X-ray CT apparatus 1 shown in FIG. 3.
Figure 5B:
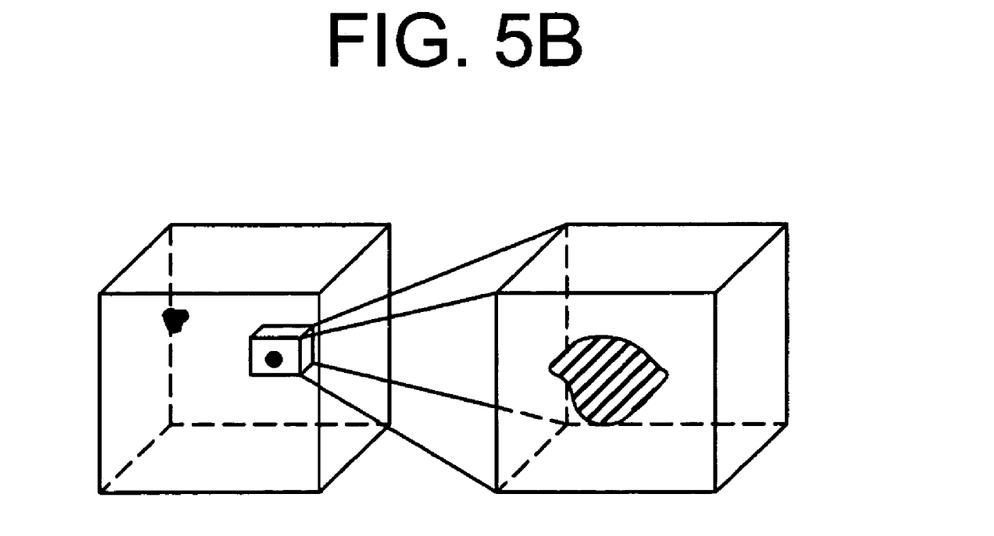

FIG. 5(*a*) and FIG. 5(*b*) are schematic diagrams illustrating the second processing method B.

As shown in FIG. 5(*a*), the second reconstruction unit 44 receives from the central processing unit 36 the data of two dimensional images, reconstructed by the first reconstruction unit 42 and having the detection object extracted by the extractor unit 54. The second reconstruction unit 44 performs the interpolation on the received two dimensional image data to generate a three dimensional image (ST 23).

Next, as shown in FIG. 5(*b*), the second reconstruction unit 44 generates the detection object image based on the condition set in step ST 1 for the generated three-dimensional image (ST 24). The central processing unit 36 outputs the detection object image to the display device unit 34, which in turn displays the generated three-dimensional image according to the specified area or magnification.

Then, the central processing unit 36 computes the volume of the detection object from within the generated three-dimensional image (ST 25).

[Comparison of detection object] Next, the processing steps for comparing the extracted detection object with the image data of the same region of the same subject in the past will be described in greater details with reference to FIG. 2 and FIG. 6.

Figure 6:
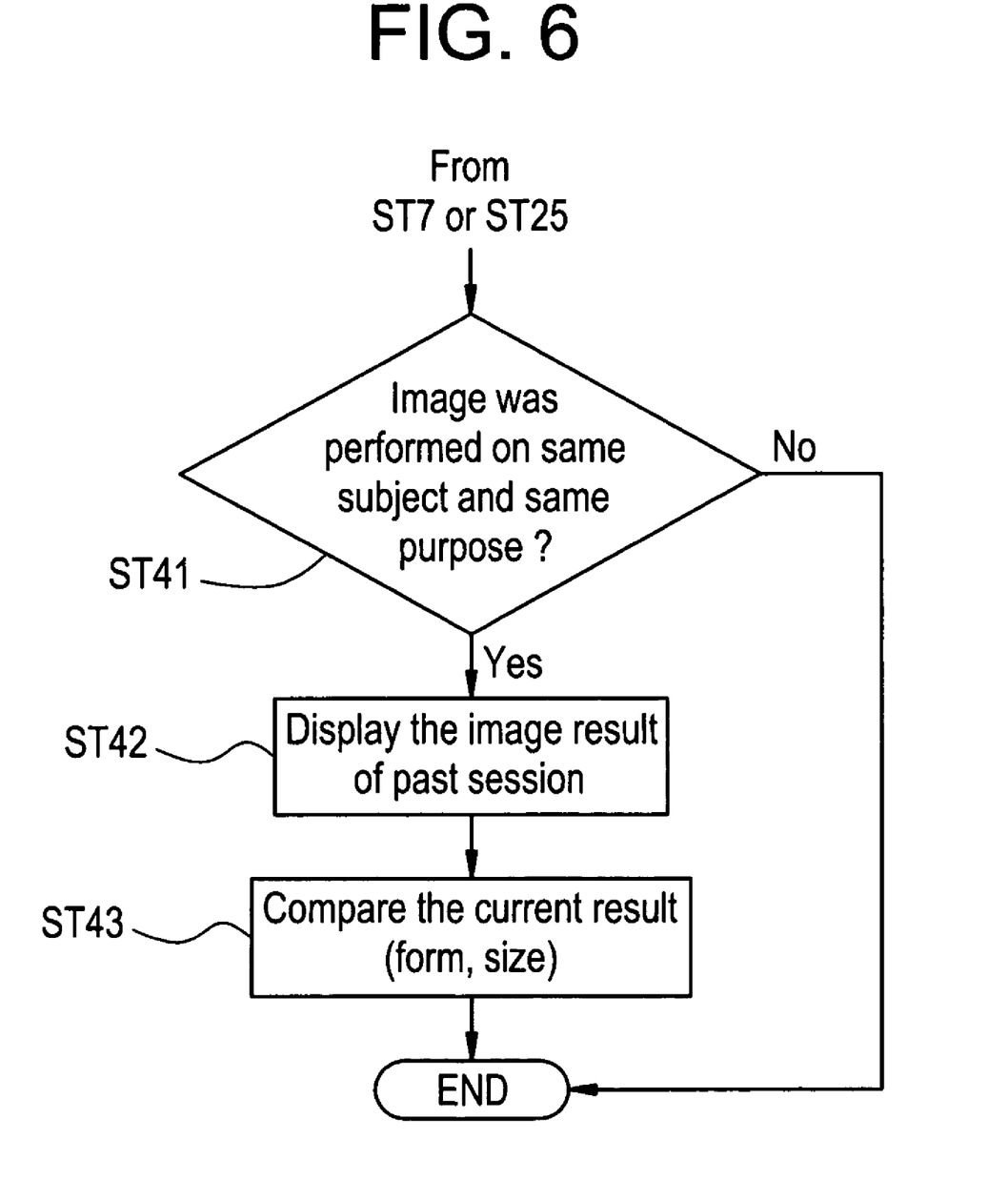
FIG. 6 shows a flow chart illustrating the operation of the X-ray CT apparatus 1 shown in FIG. 1.

FIG. 6 shows a flow chart illustrating the operation of the X-ray CT apparatus 1 in accordance with the preferred embodiment of the present invention.

The process steps will be performed under the control of the central processing unit 36 when the user decides whether or not to compare in step ST 1 and after the second reconstruction unit 44 generates the two or three-dimensional image of the detection object in the step ST 7 or ST 25.

First, the storage device unit 38 seeks the image data of the same name of subject with reference to the image data, according to the instruction from the central processing unit 36 (ST 41). The storage device unit 38 furthermore seeks the image data of the same detection object of the same name of subject.

Next, the past image data will be processed in accordance with the current selection and display conditions to display on the display device unit 34 (ST 42).

The central processing unit 36 outputs from the storage device unit 38 to the first reconstruction unit 42 the stored past image data for example such as the projection data. The first reconstruction unit 42 generates a tomographic image in a manner similar to step ST 4 shown in FIG. 2.

The first reconstruction unit 42 outputs to the extractor unit 54 of the CAD 50 through the central processing unit 36 thus generated tomographic image data. Thereafter, in a manner similar to step ST 5 of FIG. 2, the extractor unit 54 extracts the detection object from within the tomographic image generated from the past image data, in accordance with the condition defined in step ST 1.

The central processing unit 36 outputs from the extractor unit 54 to the second reconstruction unit 44 the image with the detection object extracted. Then, based on the currently selected condition in the selector unit 52, the second reconstruction unit 44 generates the image of the detection object. For example, the second reconstruction unit 44 will generate a three dimensional image, the central processing unit 36 will compute the volume of the detection object from thus generated three dimensional image.

The central processing unit 36 outputs from the second reconstruction unit 44 to the display device unit 34 the past image and data having processed.

The central processing unit 36 compares the image data and information data of the current imaging session with the image data and information data processed of the past imaging session (ST 43).

For example, the central processing unit 36 overlays the three dimensional image of the detection object imaged in the current session over the three dimensional image of the detection object imaged in the past session to identify the overlapped area of two three dimensional images. Then the central processing unit 36 outputs the identification result to the display device unit 34. The display device unit 34, based on the data received from the central processing unit 36, displays the overlapped area and unoverlapped area of two three dimensional images with different colors. The image-processing unit 40 uses the three-dimensional images to compute the volume of the detection object of both sessions to display the computation result on the display device unit 34.

As can be seen from the foregoing, the operator console 30 compares the size and the like of the detection object and displays the result so as to facilitate the identification of the growth of the detection object such as a tumor by the user. In addition, the comparison may be performed with a typical case of the detection object to be anticipated.

In accordance with the computer aided image acquisition and diagnosis system of the present invention, the user selects the image generation conditions including the detection object to be anticipated, FOV, W/W, W/L of the tomographic image and detection object image, and the like, prior to scanning the subject to be examined. The operator console 30 generates a tomographic image from the projection data obtained from a scan and generate a detection object image with the detection object extracted, which facilitates the user to read and diagnose, from the tomographic image generated. The user may need only to select the conditions prior to scanning. Since any operation can be directed from the operator console 30 of the X-ray CT apparatus, imaging efficiency will be improved.

In accordance with the computer aided image acquisition and diagnosis system described above, the imaging and image processing will be performed after the detection object to be anticipated and the image generation conditions will have been previously selected by the user, from the operator console 30, the time taken from the imaging to the reading can be saved even when a lot of images are to be imaged. In addition, the system facilitates the user to file and save the image.

The imaging apparatus in accordance with the present invention is not limited to the above preferred embodiments.

For example, the imaging apparatus in accordance with the present invention has been described with specific embodiments in an X-ray CT apparatus, the present invention is equally applied to the angiographic imaging, MRI, and any imaging apparatuses having a scanning gantry.

Many widely different embodiments of the invention may be configured without departing from the spirit and the scope of the present invention. It should be understood that the present invention is not limited to the specific embodiments described in the specification, except as defined in the appended claims.

The invention claimed is:

1. A diagnostic imaging system for imaging a subject and for obtaining a diagnostic image from projection data of the subject, said diagnostic imaging system comprising:
   a setting device configured to:
      set a detection object within an imaging region of the subject prior to performing a scan of said imaging region; and
      set a first imaging condition and a second imaging condition prior to performing the scan of said imaging region, said first imaging condition configured to generate a tomographic image of said imaging region after the scan is performed and said second imaging condition configured to generate an enlarged image with respect to said tomographic image after the scan is performed, said enlarged image including an image of said detection object and having a magnification larger than a magnification of said tomographic image;
   a scanner configured to perform the scan of said imaging region to obtain a set of projection data of said imaging region;
   a first image processing device configured to generate said tomographic image of said imaging region using said first imaging condition and the set of projection data obtained by said scanner during the scan;
   an extractor device configured to extract said detection object selected in said setting device from said tomographic image based on a character of said detection object, said character comprising a shape of said detection object;
   a second image processing device configured to generate said enlarged image using said second imaging condition and one of tomographic image data of the extracted detection object and a subset of projection data of the extracted detection object, the tomographic image data and the subset of projection data derived from the set of projection data obtained during the scan; and
   a display device configured to independently display said tomographic image generated by said first image processing device and said enlarged image generated by said second image processing device.

2. A diagnostic imaging system according to claim 1, wherein said scanner comprises:
   an X-ray irradiation unit; and
   an X-ray detector unit placed in opposition to said X-ray irradiation unit through said subject, wherein X-rays irradiated from said X-ray irradiation unit is transmitted through said subject and detected by said X-ray detector unit to thereby scan a predetermined area of said subject.

3. A diagnostic imaging system according to claim 1, wherein:
   said setting device comprises a database configured to store characteristics parameters of said detection object; and
   said extractor device is configured to compare said tomographic image to said characteristics parameters corresponding to said detection object within said tomographic image to extract image data of said detection object.

4. A diagnostic imaging system according to claim 1, wherein said first imaging condition and said second imaging condition each comprises a field of view.

5. A diagnostic imaging system according to claim 1, wherein said display device is configured to display said detection object using a color that is different from a color of an area surrounding said detection object.

6. A diagnostic imaging system according to claim 1, wherein:
   said setting device is configured to set a predetermined gradation range for said detection object;
   said second image processing device is configured to generate an image of said detection object by eliminating gradation ranges higher and lower than the predetermined gradation range; and
   said display device is configured to display said detection object having an adjusted gradation.

7. A diagnostic imaging system according to claim 1, further comprising:
   a storage device configured to store at least one of the set of projection data obtained from said scanner and data of said detection object extracted by said extractor device; and
   a comparator device configured to compare a plurality of images and image data for said detection object.

8. A diagnostic imaging system according to claim 7, wherein said comparator device is configured to compare an image of said detection object extracted by said extractor device with an image of said detection object generated in a past session for said subject stored in said storage device.

9. A diagnostic imaging system according to claim 8 wherein said display device is configured to display at least one of the image of said detection object in the past session and data of said detection object in the past session stored in said storage device.

10. A diagnostic imaging system according to claim 7, wherein said comparator device is configured to compare said detection object extracted by said extractor device with an exemplary model stored in said storage device.

11. A diagnostic imaging system according to claim 10, wherein said display device is configured to display at least one of an image of said exemplary model and data of said exemplary model stored in said storage device.

12. A diagnostic imaging system according to claim 1, wherein said second image processing device is configured to generate a three dimensional image of said detection object from said tomographic image with said detection object extracted.

13. A diagnostic imaging system according to claim 12, wherein said second image processing device is configured to enlarge a plurality of tomographic images with said detection object extracted, based on the first and second conditions set in said setting device, to generate a three dimensional image of said detection object based on said plurality of enlarged tomographic images.

14. A diagnostic imaging system according to claim 13, configured to calculate a volume of said detection object from the three dimensional image generated of said detection object in said image processing device.

15. A diagnostic imaging system according to claim 12, wherein said second image processing device is configured to use a plurality of tomographic images with said detection object extracted to generate a three dimensional image to enlarge said detection object based on the first and second conditions set in said setting device.

16. A diagnostic imaging system according to claim 1, wherein said detection object comprises a tumor.

17. A diagnostic imaging system according to claim 16, wherein said imaging region comprises a lung region and said detection object comprises a lung tumor.

18. A diagnostic imaging system according to claim 1, wherein said enlarged image has a resolution higher than a resolution of said tomographic image.

19. A diagnostic imaging system according to claim 1, wherein said setting device is configured to set a field of view for each of said enlarged image and said tomographic image, a window level for each of said enlarged image and said tomographic image, a window width for each of said enlarged image and said tomographic image, and a magnification ratio between said enlarged image and said tomographic image.

20. A diagnostic imaging system according to claim 1, wherein said setting device is configured to set a first field of view for said tomographic image and a second field of view for said enlarged image, the first field of view larger than the second field of view such that the magnification of said enlarged image is larger than the magnification of said tomographic image.

* * * * *